US012717333B2

(12) United States Patent
Badalamenti et al.

(10) Patent No.: US 12,717,333 B2
(45) Date of Patent: Aug. 25, 2026

(54) SYSTEM AND METHOD FOR LANDING AND STORING VERTICAL TAKE-OFF AND LANDING AIRCRAFT

(71) Applicant: Joby Aero, Inc., Santa Cruz, CA (US)

(72) Inventors: John Conway Badalamenti, San Francisco, CA (US); Jon David Petersen, Austin, TX (US); Ian Villa, San Francisco, CA (US)

(73) Assignee: JOBY AERO, INC., Santa Cruz, CA (US)

(*) Notice: Subject to any disclaimer, the term of this patent is extended or adjusted under 35 U.S.C. 154(b) by 0 days.

(21) Appl. No.: 19/029,142

(22) Filed: Jan. 17, 2025

(65) Prior Publication Data

US 2025/0164995 A1 May 22, 2025

Related U.S. Application Data

(63) Continuation of application No. 18/516,190, filed on Nov. 21, 2023, now Pat. No. 12,242,283, which is a (Continued)

(51) Int. Cl.
*G05D 1/00* (2024.01)
*B64C 29/00* (2006.01)

(Continued)

(52) U.S. Cl.
CPC ............. *G05D 1/102* (2013.01); *B64C 29/00* (2013.01); *E04H 6/44* (2013.01); *G05D 1/46* (2024.01); *G08G 5/26* (2025.01); *G08G 5/54* (2025.01)

(58) Field of Classification Search
CPC .......... G05D 1/102; G05D 1/46; B64C 29/00; E04H 6/44; G08G 5/26; G08G 5/54; G08G 5/22; G08G 5/76; B64F 1/222
See application file for complete search history.

(56) References Cited

U.S. PATENT DOCUMENTS

| | | | |
|---|---|---|---|
| 1,915,297 | A | 6/1933 | Cuntz |
| 3,035,789 | A | 5/1962 | Young |

(Continued)

FOREIGN PATENT DOCUMENTS

| | | | |
|---|---|---|---|
| CA | 3004452 | A1 | 5/2017 |
| EP | 0945841 | A1 | 9/1999 |

(Continued)

OTHER PUBLICATIONS

Bennaceur et al., "Passenger-centric urban air mobility: Fairness trade-offs and operational efficiency", Transportation Research: Emerging Technologies, 2021, 29 pages.

(Continued)

*Primary Examiner* — Donald J Wallace
*Assistant Examiner* — Jalal C Coduroglu
(74) *Attorney, Agent, or Firm* — Dority and Manning, P.A.

(57) ABSTRACT

A computing system for landing and storing vertical take-off and landing (VTOL) aircraft can be configured to receive aircraft data, passenger data, or environment data associated with a VTOL aircraft and determine a landing pad location within a landing facility based on the aircraft data, passenger data, and/or environment data. The landing facility can include a lower level and an upper level. The lower level can include a lower landing area and a lower storage area. The upper level can include an upper landing area. At least a portion of the upper level can be arranged over the lower storage area. The landing pad location can include a location within the lower landing area or the upper landing area of the landing facility. The computing system can communicate the landing pad location to an operator or a navigation system of the VTOL aircraft.

20 Claims, 12 Drawing Sheets

Related U.S. Application Data continuation of application No. 17/855,163, filed on Jun. 30, 2022, now Pat. No. 11,874,675, which is a continuation of application No. 16/405,436, filed on May 7, 2019, now Pat. No. 11,416,008.

(60) Provisional application No. 62/668,206, filed on May 7, 2018.

(51) Int. Cl.
*E04H 6/44* (2006.01)
*G05D 1/46* (2024.01)
*G08G 5/26* (2025.01)
*G08G 5/54* (2025.01)

(56) References Cited

U.S. PATENT DOCUMENTS 3,556,441 A * 1/1971 Oberlander ............... B64F 1/00 244/114 R
3,916,588 A 11/1975 Magill
4,022,405 A 5/1977 Peterson
4,596,097 A 6/1986 Stewart
5,438,781 A 8/1995 Landmann
5,823,468 A 10/1998 Bothe
5,839,691 A 11/1998 Lariviere
5,842,667 A 12/1998 Jones
6,193,190 B1 * 2/2001 Nance ....................... B64F 1/20 244/114 R
6,343,127 B1 1/2002 Billoud
6,609,473 B1 8/2003 Cavanagh
6,892,980 B2 5/2005 Kawai
8,016,226 B1 9/2011 Wood
8,020,804 B2 9/2011 Yoeli
8,311,686 B2 11/2012 Herkes et al.
8,733,690 B2 5/2014 Bevirt et al.
8,737,634 B2 5/2014 Brown et al.
8,849,479 B2 9/2014 Walter
9,205,930 B2 12/2015 Yanagawa
9,387,928 B1 7/2016 Gentry et al.
9,412,280 B1 * 8/2016 Zwillinger ............... G08G 5/55
9,415,870 B1 8/2016 Beckman et al.
9,422,055 B1 8/2016 Beckman et al.
9,435,661 B2 9/2016 Brenner et al.
9,442,496 B1 9/2016 Beckman et al.
9,550,561 B1 1/2017 Beckman et al.
9,663,237 B2 5/2017 Senkel et al.
9,694,911 B2 7/2017 Bevirt et al.
9,701,425 B2 7/2017 Lee et al.
9,771,157 B2 9/2017 Gagne et al.
9,786,961 B2 10/2017 Dyer et al.
9,802,702 B1 10/2017 Beckman et al.
9,816,529 B2 11/2017 Grissom et al.
9,838,436 B2 12/2017 Michaels
10,140,873 B2 11/2018 Adler et al.
10,152,894 B2 12/2018 Adler et al.
10,216,190 B2 2/2019 Bostick et al.
10,249,200 B1 4/2019 Grenier et al.
10,304,344 B2 5/2019 Moravek et al.
10,330,482 B2 6/2019 Chen et al.
10,593,215 B2 3/2020 Villa
10,593,217 B2 3/2020 Shannon
10,752,365 B2 8/2020 Galzin
10,759,537 B2 9/2020 Moore et al.
10,768,201 B2 9/2020 Luo et al.
10,832,581 B2 11/2020 Westervelt et al.
10,836,470 B2 11/2020 Liu et al.
10,913,528 B1 2/2021 Moore et al.
10,948,910 B2 3/2021 Taveira et al.
10,960,785 B2 3/2021 Villanueva et al.
11,130,566 B2 9/2021 Mikic et al.
11,145,211 B2 10/2021 Goel et al.
11,238,745 B2 2/2022 Villa et al.
11,295,622 B2 4/2022 Goel et al.
11,874,675 B2 1/2024 Petersen
2003/0063004 A1 4/2003 Anthony
2005/0247824 A1 11/2005 Allison
2006/0038069 A1 2/2006 Cawley
2010/0079342 A1 4/2010 Smith et al.
2014/0032034 A1 1/2014 Raptopoulos et al.
2014/0179535 A1 6/2014 Stückl et al.
2014/0252168 A1 9/2014 Brody
2014/0285113 A1 9/2014 Huang
2015/0032298 A1 1/2015 Pepitone
2016/0117931 A1 4/2016 Chan et al.
2016/0117933 A1 4/2016 Chan et al.
2016/0225264 A1 8/2016 Taveira
2016/0307450 A1 10/2016 Songa
2016/0311529 A1 10/2016 Brotherton-Ratcliffe et al.
2017/0030735 A1 * 2/2017 Mohideen .............. B64D 43/00
2017/0069214 A1 3/2017 Dupray et al.
2017/0197710 A1 * 7/2017 Ma .......................... G06F 21/31
2017/0320593 A1 * 11/2017 Van Beest ................. B64F 1/20
2017/0357914 A1 12/2017 Tulabandhula et al.
2018/0018887 A1 1/2018 Sharma et al.
2018/0053425 A1 2/2018 Adler et al.
2018/0061243 A1 3/2018 Shloosh
2018/0079530 A1 3/2018 Wyrobek
2018/0203465 A1 7/2018 Suzuki
2018/0216988 A1 8/2018 Nance
2018/0308366 A1 10/2018 Goel et al.
2018/0320402 A1 * 11/2018 Evans ..................... B60L 53/00
2018/0354636 A1 12/2018 Darnell et al.
2019/0146508 A1 5/2019 Dean et al.
2019/0221127 A1 7/2019 Shannon
2019/0248511 A1 * 8/2019 Lewis ....................... B64F 1/20
2019/0316849 A1 10/2019 Abrego et al.
2019/0339720 A1 11/2019 Petersen et al.
2020/0103922 A1 4/2020 Nonami et al.
2020/0182637 A1 6/2020 Kumar et al.
2020/0207485 A1 7/2020 Foggia
2020/0229206 A1 * 7/2020 Badic ................ H04W 28/0226
2020/0388166 A1 12/2020 Rostamzadeh et al.
2022/0374029 A1 11/2022 Petersen et al.

FOREIGN PATENT DOCUMENTS

EP 2698749 A1 2/2014
EP 3499634 A1 6/2019
JP 2010/095246 A 4/2010
JP 2013/086795 A 5/2013
WO WO 2016/122780 A1 8/2016
WO WO 2017/029611 A1 2/2017
WO WO 2017/077416 A1 5/2017
WO WO 2017/100579 A1 6/2017
WO WO 2018/023556 A1 2/2018
WO WO 2019/089677 A1 5/2019
WO WO 2020/252024 A1 12/2020

OTHER PUBLICATIONS

FAA AC No. 150/5390-2C. Subject: Heliport Design (Year: 2012).
FAA AC No. 150/5360-14A. Subject: Access to Airports by Individuals with Disabilities (Year: 2017).
FAA AC No. 150/5340-1 M. Subject: Standards for Airport Markings (Year: 2020).
International Search Report and Written Opinion for Application No. PCT/US2019/031134, mailed on Jul. 5, 2019, 17 pages.
Jong, "Optimizing cost effectiveness and flexibility of air taxis: A case study for optimization of air taxi operations", University of Twente, Master's thesis, 2007, 62 pages.
Miao et al., "Data-driven robust taxi dispatch under demand uncertainties", IEEE Transactions on Control Systems Technology 27, No. 1, 2017, 16 pages.
Miao et al., "Taxi dispatch with real-time sensing data in metropolitan areas: A receding horizon control approach", In Proceedings of the ACM/IEEE Sixth International Conference on Cyber-Physical Systems, 2015, 15 pages.
Horonjeff , et al. "Planning and Design of Airports", Fifth Edition. ISBN: 978-0-07-164255-2, MHID: 0-07-164255-2. The material in this eBook also appears in the print version of this title: ISBN: 978-0-07-1 (Year: 2010).

(56) References Cited

OTHER PUBLICATIONS

Uber, "Fast-forwarding to a future of on-demand urban air transportation", 2016, 99 pages.

* cited by examiner

SYSTEM AND METHOD FOR LANDING AND STORING VERTICAL TAKE-OFF AND LANDING AIRCRAFT

RELATED APPLICATIONS

This application is a continuation of U.S. application Ser. No. 18/516,190 having a filing date of Nov. 21, 2023, which is a continuation of U.S. application Ser. No. 17/855,163 having a filing date of Jun. 30, 2022 (issued as U.S. Pat. No. 11,874,675 on Jan. 16, 2024), which is a continuation of U.S. application Ser. No. 16/405,436 having a filing date of May 7, 2019 (issued as U.S. Pat. No. 11,416,008 on Aug. 16, 2022), which claims priority to and the benefit of U.S. Provisional Patent Application No. 62/668,206 filed on May 7, 2018. Applicant claims priority to and the benefit of each of such applications and incorporates all such applications herein by reference in its entirety.

FIELD

The present disclosure relates generally to aviation transportation using vertical take-off and landing aircraft. More particularly, the present disclosure relates to systems and methods for landing and storing vertical take-off and landing aircraft with an aircraft landing facility.

BACKGROUND

A wide variety of modes of transport are available within cities. For example, people may walk, ride a bike, drive a car, take public transit, or use a ride sharing service. As population densities and demand for land increase, however, many cities are experiencing problems with traffic congestion and the associated pollution. Consequently, there is a need to expand the available modes of transport in ways that may reduce the amount of traffic without requiring the use of large amounts of land.

Air travel within cities may reduce travel time over purely ground-based approaches and alleviate problems associated with traffic congestion. In practice, however, air travel within cities has been fairly limited compared to ground travel of various impediments that complicate intra-city air travel. For instance, aircraft can require significant resources such as fuel and infrastructure (e.g., runways, landing areas), produce significant noise, and require significant time for boarding, each presenting technical challenges for achieving larger volume of air travel within cities or between neighboring cities.

Vertical takeoff and landing (VTOL) aircraft provide opportunities to incorporate aerial transportation into transport networks for cities and metropolitan areas. VTOL aircraft require much less space to take-off and land than other types of aircraft, making them more suitable for densely populated urban environments. Landing and storing VTOL aircraft in such densely populated areas, however, still presents a variety of challenges. For example, existing infrastructure, such as rooftops of buildings provides a relatively small capacity for landing and storing multiple VTOL aircraft.

SUMMARY

Aspects and advantages of embodiments of the present disclosure will be set forth in part in the following description, or can be learned from the description, or can be learned through practice of the embodiments.

One example aspect of the present disclosure is directed to a computing system for landing and storing vertical take-off and landing aircraft (VTOL). The computing system can include one or more processors and one or more non-transitory computer-readable media that collectively store instructions that, when executed by the one or more processors, cause the computing system to perform operations. The operations can include receiving at least one of aircraft data associated with a VTOL aircraft, passenger data associated with at least one passenger of the aircraft, or environment data describing an environment condition of at least one of the aircraft or a VTOL aircraft landing facility. The operations can include determining a landing pad location within the landing facility. The landing facility can include a lower level and an upper level. The lower level can include a lower landing area and a lower storage area that is spaced apart from the lower landing area. The upper level can include an upper landing area. At least a portion of the upper level can be arranged over the lower storage area with respect to a vertical direction. The landing pad location can include a location within the lower landing area or the upper landing area of the landing facility that is dynamically designated based on the at least one of aircraft data, passenger data, or environment data. The operations can include communicating the landing pad location to at least one of an operator of the VTOL aircraft or a navigation system of the VTOL aircraft.

The technology described herein can help improve the safety of passengers of an VTOL aircraft, improve the safety of the surroundings of the VTOL aircraft, improve the experience of the rider and/or operator of the VTOL aircraft, as well as provide other improvements as described herein. Moreover, the technology of the present disclosure can help improve the ability of a VTOL aircraft to effectively provide vehicle services to others and support the various members of the community in which the VTOL aircraft is operating, including persons with reduced mobility and/or persons that are underserved by other transportation options. Additionally, the system supporting VTOL aircrafts and the use of such aircrafts of the present disclosure may reduce traffic congestion in communities as well as provide alternate forms of transportation that may provide environmental benefits.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
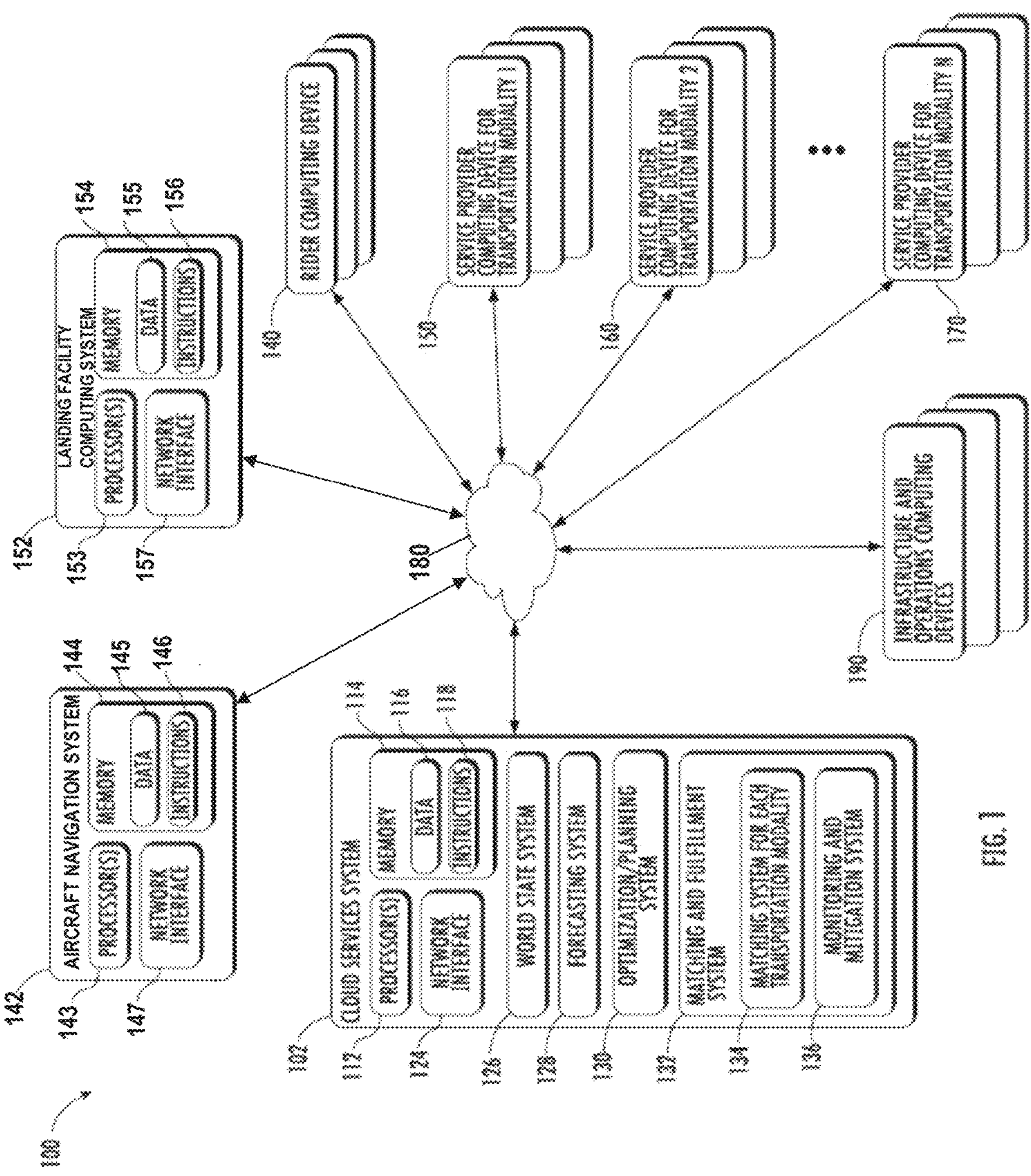
FIG. 1 depicts a block diagram of an example computing system according to example embodiments of the present disclosure.

Example aspects of the present disclosure are directed to systems and methods for landing and storing vertical takeoff and landing (VTOL) aircraft. More particularly, the disclosed systems and methods may facilitate compact storage of VTOL aircraft using a multi-level aircraft landing facility. This may be particularly useful in urban settings, in which real estate is expensive. Aspects of the disclosed systems and methods are directed to routing an approaching VTOL aircraft in a manner that increases (e.g., optimizes, maximizes, etc.) efficiency for approaching and departing VTOL aircraft while maintaining minimum safety distances and/or other requirements for VTOL aircraft that are landing and taking off. The VTOL aircraft can be fully autonomous, semi-autonomous, or fully operated by a pilot/operator.

The aircraft landing facility can be constructed or installed in an unobstructed area to facilitate safe approach, landing, and takeoff of the VTOL aircraft. For example, the aircraft landing facility can be constructed or installed on a roof of a structure, such as a building, parking structure, or any other suitable structure. The aircraft landing facility can have multiple levels for landing and storing the VTOL aircraft to provide more compact storage of the VTOL aircraft than simply landing the VTOL aircraft on the roof of the building. This can provide landing areas at different elevations. For example, the landing facility may include a lower level and an upper level. The lower level may include a lower landing area and a lower storage area that is spaced apart (e.g., distinct) from the lower landing area. The upper level may include an upper landing area and/or an upper storage area. The upper level may be supported over the lower level such that at least a portion of the upper level is arranged over the lower storage area. As such, the upper level may provide shelter from precipitation or the sun for the storage area. This configuration can allow the VTOL aircraft to land in the lower landing area and then be moved to the lower storage area for storage and to allow passenger(s) of the VTOL aircraft to exit the VTOL aircraft in the shelter provided by the upper level.

A computing system can be configured to perform routing of approaching VTOL aircraft in a manner that attempts to optimize or maximize efficiency (e.g., vehicle throughput, minimize downtime, etc.) while maintaining safety requirements (e.g., distances) required for VTOL aircraft to land and take off. For example, the computing system can be configured to determine a suitable landing pad location at the aircraft landing facility for the approaching VTOL aircraft based on a variety of factors. The factors can include aircraft data associated with the VTOL aircraft, passenger data associated with passenger(s) of the VTOL aircraft, and/or environment data that describes an environment condition of the VTOL aircraft or the landing facility. The computing system can communicate the landing pad location to an operator of the VTOL aircraft and/or a navigation system of the VTOL aircraft (e.g., computing system aboard the VTOL aircraft).

In some embodiments, the landing area(s) can have a plurality of pre-defined landing pads (e.g., marked by paint, tape, or another permanent or semi-permanent indicator). The computing system can select one of the pre-defined landing pads for the approaching VTOL aircraft based on the factors described above. In other embodiments, however, the computing system can select one or more of a location or a size of for a landing pad that is not pre-defined within the landing area. For example, the location and/or size of the landing pad can be selected based on the above-described parameters and/or a minimum required distance between the VTOL aircraft and any additional aircraft at the landing facility.

The computing system can communicate the landing pad location in a variety of suitable manners. For example, the computing system can illuminate or alter the appearance of one or more location markers within the landing area(s). A light array can be configured to illuminate or otherwise change an appearance (e.g., brightness, color, etc.). of select portions (e.g., location markers) of the lower landing area or the upper landing area to communicate the landing pad location. For example, the computing system can illuminate at least a portion of a border or a center of a landing pad at the landing pad location using the light array to communicate the landing pad location. In some embodiments, the light array can include a plurality of lights spaced arranged in a plurality of rows and a plurality of columns to form a grid that covers some or all of one or both of the landing areas. The grid can allow the computing system to dynamically designate the landing pad location anywhere within the grid. Thus, the computing system can dynamically designate a landing pad location having a suitable size and location for the approaching VTOL aircraft (e.g., ensuring a minimum safety distance between VTOL aircraft) without being constrained to simply selecting a pre-defined landing pad location.

As another example, the computing system can wirelessly communicate data describing the landing pad location to the navigation system of the aircraft. Similarly, in this embodiment, the computing system can determine a size and location of a landing pad and dynamically designate a landing pad location for the approaching VTOL aircraft (e.g., with or without illuminating location markers to mark the landing pad location). Alternatively, in this embodiment, the computing system can select the landing pad location from one of a plurality of pre-determined landing pads and communicate the location of the selected pre-determined landing pad to the navigation system of the aircraft (e.g., with or without illuminating location markers to mark the landing pad location). As indicated above, the VTOL aircraft can be autonomous, semi-autonomous, or fully operated by a pilot/operator. For fully autonomous VTOL aircraft, the VTOL aircraft may proceed to land at the landing pad location based on the communication received from the computing system without human action.

The aircraft landing facility may be configured to store a plurality of VTOL aircraft within the storage area(s) of the aircraft landing facility. For example, the lower storage area may include a plurality of storage locations. The computing system can select one of the storage locations for storage of the aircraft based on one or more of parameters, such as the aircraft data, the passenger data, or the environment data. The computing system can communicate the selected storage location to the operator of the aircraft or the navigation system of the aircraft. Thus, the VTOL aircraft can be moved from the landing pad location on which the VTOL aircraft lands to the selected storage location. For example, an operator of the VTOL aircraft can control the VTOL aircraft to move it to the selected storage location based on receiving the communication of the selected storage location (e.g., the selected storage location or a path to it can be illuminated or otherwise visually marked). As another example, an autonomous VTOL aircraft can autonomously move itself from the landing pad location to the selected storage location in response to receiving the selected storage location from the computing system.

In some embodiments, one or more of the storage locations may also be dynamically re-purposed for on-demand maintenance of the VTOL aircraft as needed. This may be used to improve throughput and/or address unplanned servicing needs of the VTOL aircraft.

As indicated above, the computing system can determine the landing pad location and/or select the storage location for an approaching VTOL aircraft based on one or parameters. The parameters can include aircraft data associated with the VTOL aircraft, passenger data associated with passenger(s) of the VTOL aircraft, and/or environment data that describes an environment condition of the VTOL aircraft or the landing facility. Example aircraft data may include a size, weight, a charge state (if applicable, a fuel level (if applicable), and a heading of the VTOL aircraft, itinerary information (e.g., a future destination, previous origination) of the VTOL aircraft, acoustic signature of the VTOL aircraft (e.g., as detected by one or more microphone at the landing facility), and/or a number, size, or weight, of packages about the VTOL aircraft. The acoustic signature of the VTOL aircraft may be described or quantified by various data such as SPL (sound pressure level), EPNdB (Effective Perceived Noise in decibels), TVL (time-varying loudness), and/or other suitable metrics (e.g., metrics describing amplitude noise impacts as and/or spectral characteristics of landings and takeoffs).

The passenger data may include a number of passengers aboard the VTOL aircraft, a disability status of the passenger (s), an age of the passenger(s), a subsequent destination of the passenger(s), an origination location of the passenger(s), and/or a number, size, or weight, of baggage or luggage of the passenger(s). For instance, larger/heavier baggage loads may incur larger multimodal switching costs or require special infrastructure to facilitate faster takeoffs and landings. Thus, the parking pad location and/or orientation of the VTOL aircraft at the landing pad may be selected to reduce delay associated with loading and offloading baggage (e.g., multimodal switching time costs).

Example environment data may include a wind speed, a wind direction, a precipitation condition, a temperature, and/or a presence, size, or location of additional aircraft at the landing facility or approaching the landing facility. Environment data can also include ambient noise signatures, for example, of multiple VTOL aircraft at or near the landing facility (e.g., as detected by one or more microphone at the landing facility).

In some implementations, the computing system can be configured to manage landing and/or takeoff of multiple VTOL aircraft simultaneously or near simultaneously. For example, the computing system can determine an additional landing pad location for an additional VTOL aircraft that is approaching the landing facility. The computing system can communicate the additional landing pad location to an operator and/or navigation system of the additional aircraft. For instance, the computing system can monitor a location of the VTOL aircraft and the additional location of the additional VTOL aircraft during approach and landing of both of the VTOL aircraft. In some embodiments, the VTOL aircraft can land on the landing pad within one minute or less of each other.

In some implementations, the computing system can determine the elevation at which the VTOL aircraft is to land within the aircraft landing facility. For example, the computing system can determine on which level to land the VTOL aircraft based on aircraft data, passenger data, and/or environment data. The computing system can make this determination based on passenger data such as a disability status, an age, a health status, or an itinerary of the passenger (s). For example, the computing system can prioritize VTOL aircraft with elderly people or people with disabilities or health issues aboard for landing on the lower level. As another example, the computing system can prioritize VTOL aircraft for landing on the lower level that contain passengers who are rushed based on their itinerary (e.g., have a quick connection with another mode of transportation or have an upcoming appointment). After selecting one of the landing areas, the computing system can designate the landing pad location within the selected landing area.

The aircraft landing facility may have a variety of configurations. For example, in some embodiments, the upper storage area can have an upper storage area that is spaced apart (e.g., distinct) from the upper landing area. The upper storage area can be arranged over the lower storage area. An additional level can be supported over at least a portion of the upper storage area. The additional storage area can serve one or more purposes. For example, the additional storage area can provided shelter for the storage area of the upper level and/or provide a location for landing VTOL aircraft (e.g., in an emergency situation).

In some embodiments, at least one sensor can be configured to detect a location of the VTOL aircraft relative to the landing pad location. For example, a portion of the computing system (e.g., a landing facility computing system) can be operatively connected with the sensor(s) and configured to detect the presence and/or location of VTOL aircraft within the landing areas and/or storage areas.

With reference now to the Figures, example embodiments of the present disclosure will be discussed in further detail.

Example Embodiments

FIG. 1 depicts a block diagram of an example computing system 100 according to example embodiments of the present disclosure. The computing system 100 includes a cloud services system 102 that can operate to control, route, monitor, and/or communicate with VTOL aircraft. These operations can be performed as part of a multi-modal transportation service for passengers, for example, including travel by ground vehicle and travel by VTOL aircraft.

The cloud services system 102 can be communicatively connected over a network 180 to one or more passenger computing devices 140, one or more service provider computing devices 150 for a first transportation modality, one or more service provider computing devices 160 for a second transportation modality, one or more service provider computing devices 170 for an Nth transportation modality, and one or more infrastructure and operations computing devices 190.

Each of the computing devices 140, 150, 160, 170, 190 can include any type of computing device such as a smartphone, tablet, hand-held computing device, wearable computing device, embedded computing device, navigational computing device, vehicle computing device, etc. A computing device can include one or more processors and a memory (e.g., similar to as will be discussed with reference to processors 112 and memory 114). Although service provider devices are shown for N different transportation modalities, any number of different transportation modalities can be used, including, for example, less than the three illustrated modalities (e.g., one or more modalities can be used).

The cloud services system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the cloud services system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally or alternatively, the instructions 118 can be executed in logically and/or virtually separate threads on processor(s) 112. For example, the memory 114 can store instructions 118 that when executed by the one or more processors 112 cause the one or more processors 112 to perform any of the operations and/or functions described herein.

The computing system 100 can include an aircraft navigation system 142. The aircraft navigation system 142 can include one or more processors 143, memory 144, and a network interface 147, for example as described above with reference to the processors 112, memory 114, and network interface 124. The memory 144 can include data 145 and instructions 146, for example as described above with reference to the data 116 and instructions 118 of memory 114.

The computing system 100 can include a landing facility computing system 152. The landing facility computing system 152 can be included in the cloud services system 102 and/or one or more functions/systems of the cloud services computing system 102 can be included in the landing facility computing system 152. The landing facility computing system 152 can include one or more processors 153, memory 154, and a network interface 157, for example as described above with reference to the processors 112, memory 114, and network interface 124. The memory 154 can include data 155 and instructions 156, for example as described above with reference to the data 116 and instructions 118 of memory 114.

The cloud services system 102 can include a number of different systems such as a world state system 126, a forecasting system 128, an optimization/planning system 130, and a matching and fulfillment system 132. The matching and fulfillment system 132 can include a different matching system 134 for each transportation modality and a monitoring and mitigation system 136. Each of the systems 126-136 can be implemented in software, firmware, and/or hardware, including, for example, as software which, when executed by the processors 112 cause the cloud services system 102 to perform desired operations. The systems 126-136 can cooperatively interoperate (e.g., including supplying information to each other).

The world state system 126 can operate to maintain data descriptive of a current state of the world. For example, the world state system 126 can generate, collect, and/or maintain data descriptive of predicted passenger demand; predicted service provider supply; predicted weather conditions; planned itineraries; pre-determined transportation plans (e.g., flight plans) and assignments; current requests; current ground transportation service providers; current transportation node operational statuses (e.g., including recharging or re-fueling capabilities); current aircraft statuses (e.g., including current fuel or battery level); current aircraft pilot statuses; current flight states and trajectories; current airspace information; current weather conditions; current communication system behavior/protocols; and/or the like. The world state system 126 can obtain such world state information through communication with some or all of the devices 140, 150, 160, 170, 190. For example, devices 140 can provide current information about passengers while devices 150, 160, and 170 can provide current information about service providers. Devices 190 can provide current information about the status of infrastructure and associated operations/management.

The forecasting system 128 can generate predictions of the demand and supply for transportation services at or between various locations over time. The forecasting system 128 can also generate or supply weather forecasts. The forecasts made by the system 128 can be generated based on historical data and/or through modeling of supply and demand. In some instances, the forecasting system 128 can be referred to as an RMR system, where RMR refers to "routing, matching, and recharging." The RMR system can be able to simulate the behavior of a full day of activity across multiple ride share networks.

The optimization/planning system 130 can generate transportation plans for various transportation assets and/or can generate itineraries for passengers. For example, the optimization/planning system 130 can perform flight planning. As another example, optimization/planning system 130 can plan or manage/optimize itineraries which include interactions between passengers and service providers across multiple modes of transportation.

The matching and fulfillment system 132 can match a passenger with a service provider for each of the different transportation modalities. For example, each respective matching system 134 can communicate with the corresponding service provider computing devices 150, 160, 170 via one or more APIs or connections. Each matching system 134 can communicate trajectories and/or assignments to the corresponding service providers. Thus, the matching and fulfillment system 132 can perform or handle assignment of ground transportation, flight trajectories, take-off/landing, etc.

The monitoring and mitigation system 136 can perform monitoring of user itineraries and can perform mitigation when an itinerary is subject to significant delay (e.g., one of the legs fails to succeed). Thus, the monitoring and mitigation system 136 can perform situation awareness, advisories, adjustments and the like. The monitoring and mitigation system 136 can trigger alerts and actions sent to the devices 140, 150, 160, 170, and 190. For example, passengers, service providers, and/or operations personnel can be alerted when a certain transportation plan has been modified and can be provided with an updated plan/course of action. Thus, the monitoring and mitigation system 136 can have additional control over the movement of aircraft, ground vehicles, pilots, and passengers.

In some implementations, the cloud services system 102 can also store or include one or more machine-learned models. For example, the models can be or can otherwise include various machine-learned models such as support vector machines, neural networks (e.g., deep neural networks), decision-tree based models (e.g., random forests), or other multi-layer non-linear models. Example neural networks include feed-forward neural networks, recurrent neural networks (e.g., long short-term memory recurrent neural networks), convolutional neural networks, or other forms of neural networks.

In some instances, the service provider computing devices 150, 160, 170 can be associated with autonomous vehicles (e.g., autonomous VTOL aircraft). Thus, the service provider computing devices 150, 160, 170 can provide communication between the cloud services system 102 and an autonomy stack of the autonomous vehicle which autonomously controls motion of the autonomous vehicles.

The infrastructure and operations computing devices 190 can be any form of computing device used by or at the infrastructure or operations personnel including, for example, devices configured to perform passenger security checks, luggage check in/out, re-charging/re-fueling, safety briefings, vehicle check in/out, and/or the like.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Figure 2:
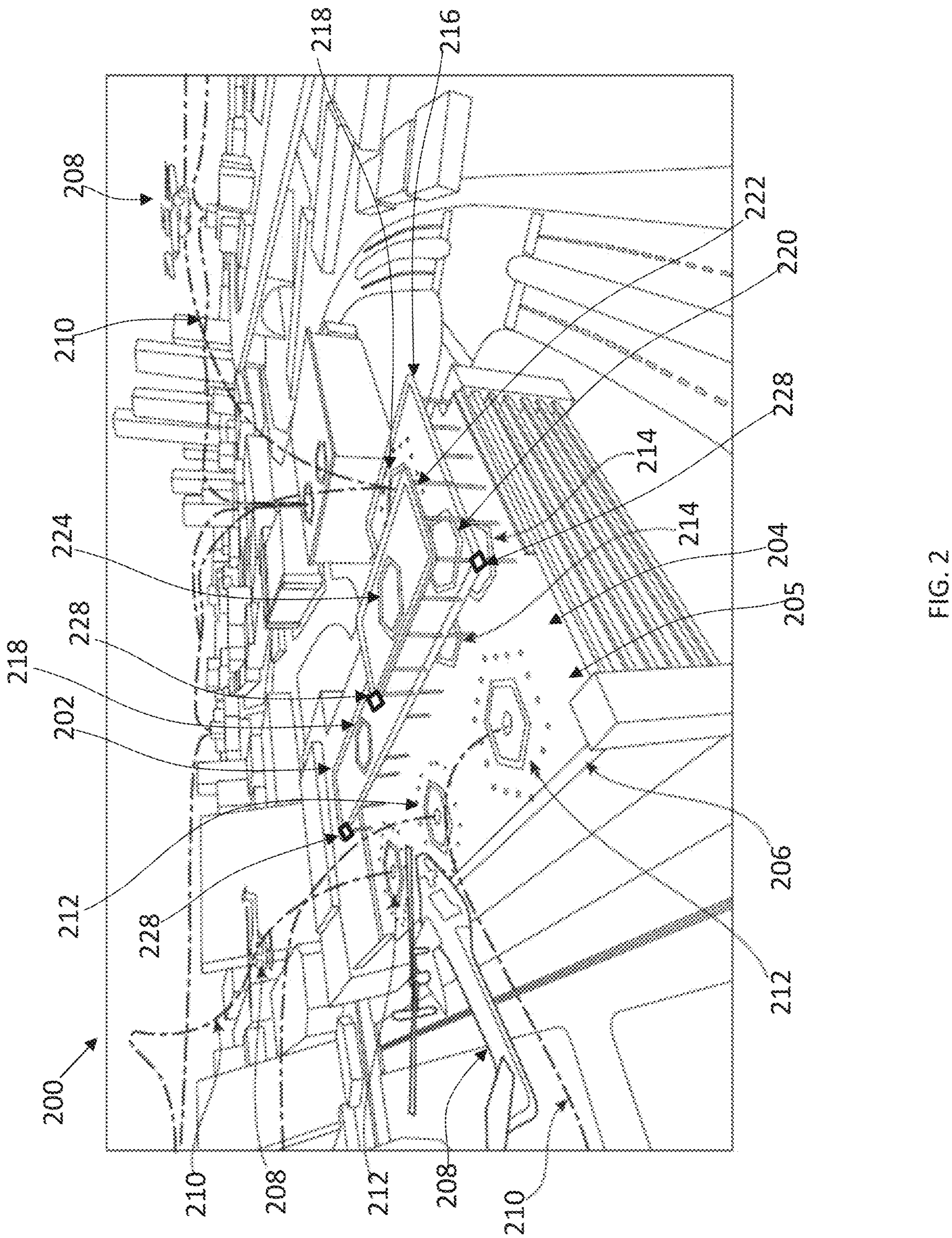
FIG. 2 depicts an example embodiment of portions of a system according to aspects of the present disclosure set in an urban environment.

FIG. 2 illustrates an example embodiment of portions of a system 200 in an urban environment according to aspects of the present disclosure. The system can include or be implemented with an aircraft landing facility 202. The aircraft landing facility 202 may be located on a roof 204 of a structure 206, such as a parking garage. The aircraft landing facility 202 may provide landing and/or take-off locations for one or more VTOL aircraft 208.

The aircraft landing facility 202 can include a lower level 205, which may include the roof 204 of the structure 206 and/or a platform supported on the roof 204 of the structure 206. The lower level 205 can include a lower landing area including one or more landing locations 212 and a storage area that includes one or more lower storage locations 214. The aircraft landing facility 202 can include an upper level 216 that is supported over at least a portion of the lower level 205. For example, the upper level 216 can be located over one or more of the lower storage locations 214. The upper level 216 can have one or more upper landing locations 218 within an upper landing area and one or more storage locations 220 within an upper storage area. An additional level 222 may be arranged over the storage location(s) 220 of the upper level 216. The additional level 222 may include an emergency landing location 224 within an emergency landing area 226. However, it should be understood that, in some embodiments, the aircraft landing facility 202 may be free of any additional levels above the upper level 216.

A computing system, for example as described with reference to FIG. 1, can be configured to control, route, monitor, and/or communicate with VTOL aircraft in the vicinity of the aircraft landing facility 202, for example as described herein. The computing system can be configured to determine or aid in determining respective routes 210 for the VTOL aircraft 208 for landing on the aircraft landing facility 202 and/or taking-off from the aircraft landing facility 202. The computing system can determine respective landing pad locations on which the VTOL aircraft 208 can land.

In some embodiments, one or more sensors 228 can be configured to detect a location of the VTOL aircraft 208 relative to the landing pad location (e.g., during approach, landing, taxing, or storage). For example, a portion of the computing system (e.g., a landing facility computing system located at the aircraft landing facility 200) can be operatively connected with the sensor(s) 228 and configured to detect the presence and/or location of VTOL aircraft 208 within the landing areas, within the storage areas, during approach and/or during takeoff. The sensors 228 can be any suitable type of sensor including optical, infrared, heat, radar, LIDAR, pressure, capacitive, inductive, etc. As illustrated, the sensors 228 can be mounted on the upper level 216 or additional level 222. However, in other embodiments, the sensors 228 can be mounted within the lower level 302 (shown in FIG. 3) and/or upper level 216, for example as capacitive sensors to detect the presence/location of the VTOL aircraft 208 in the lower level 302 and/or upper level.

Figure 3:
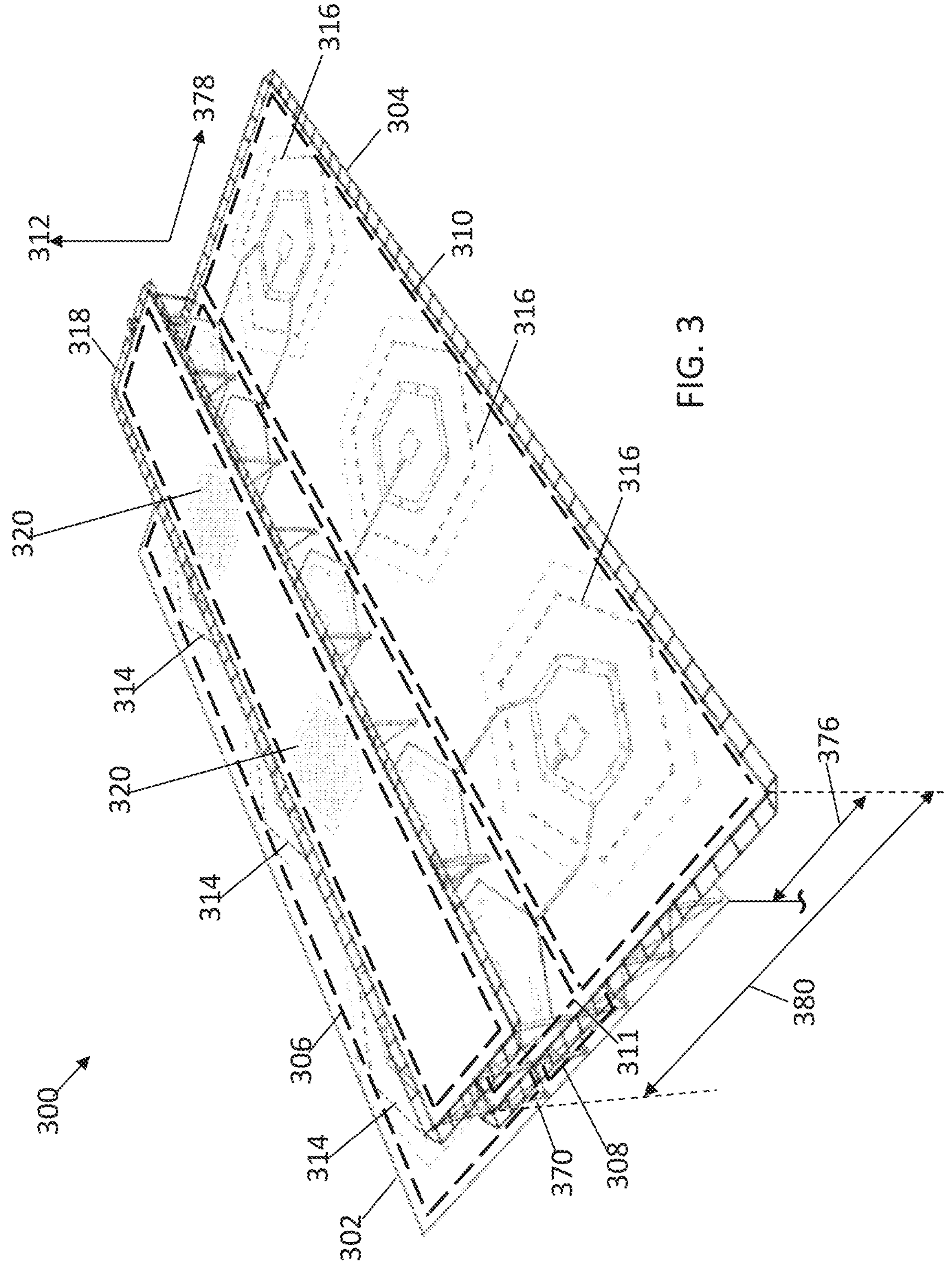
FIGS. 3 and 4 are perspective views of one embodiment of an aircraft landing facility according to aspects of the present disclosure.
Figure 4:
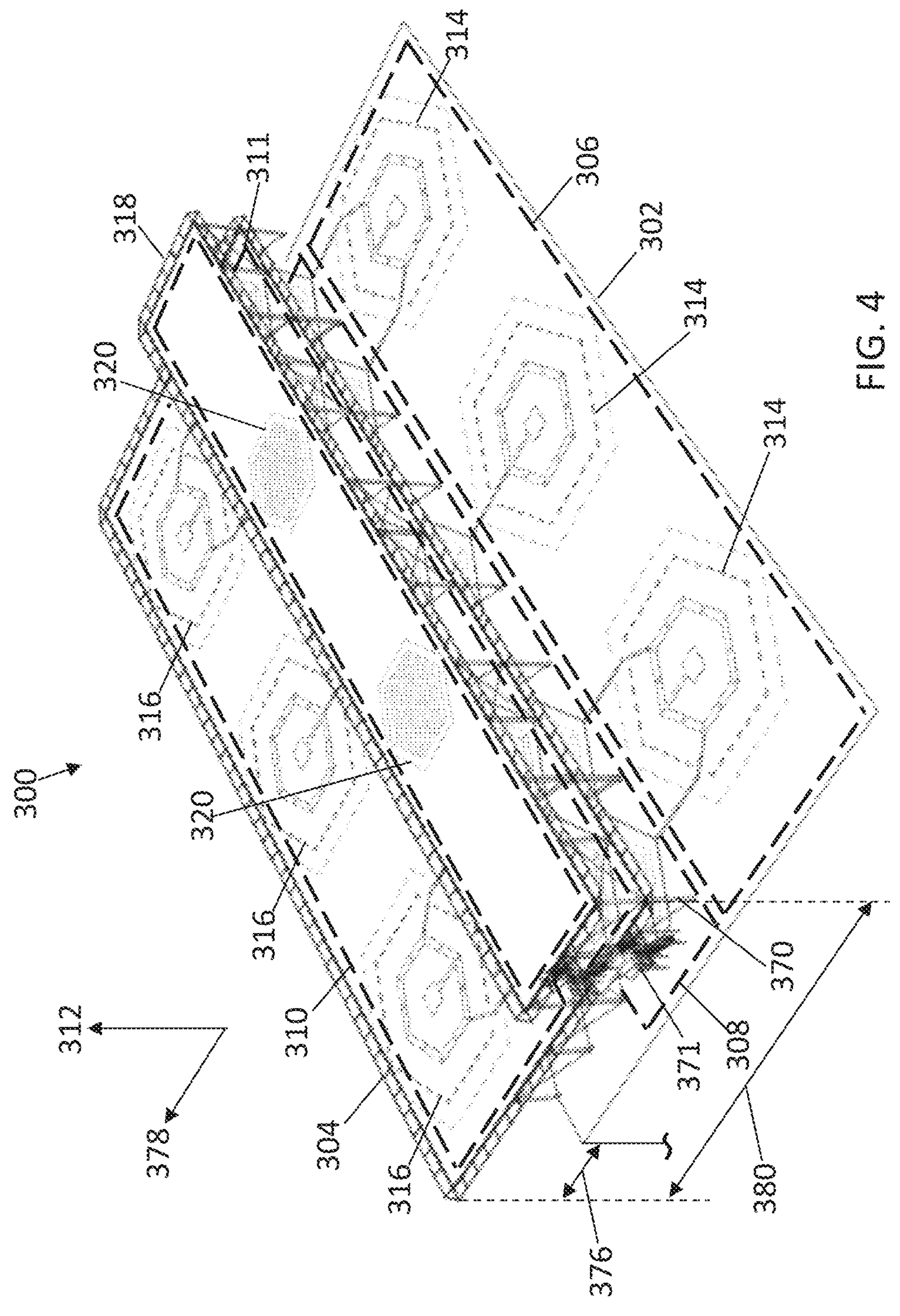
Figure 5:
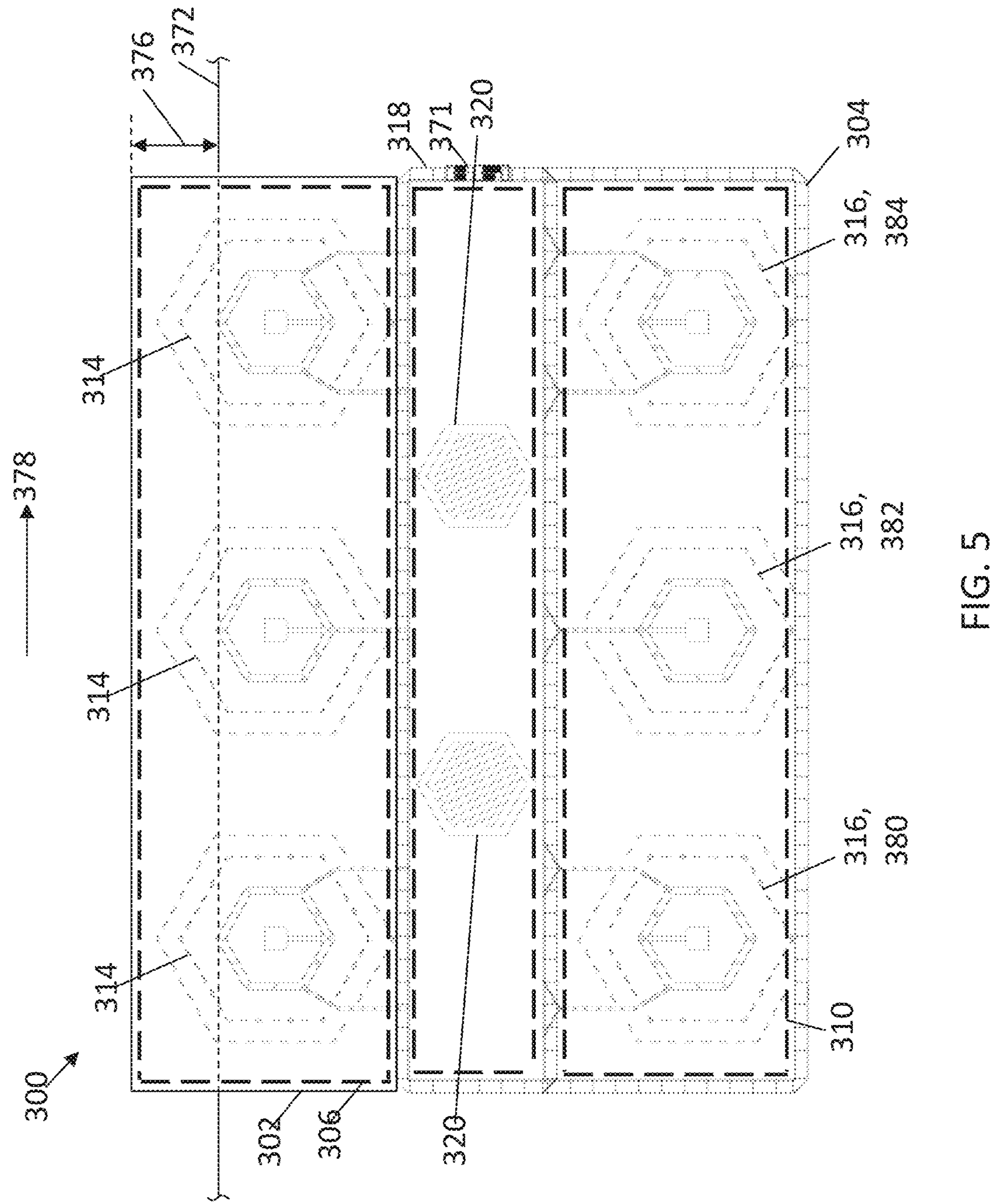
FIGS. 5 and 6 are a top down view and a side elevation view, respectively, of the aircraft landing facility of FIGS. 3 and 4.
Figure 6:
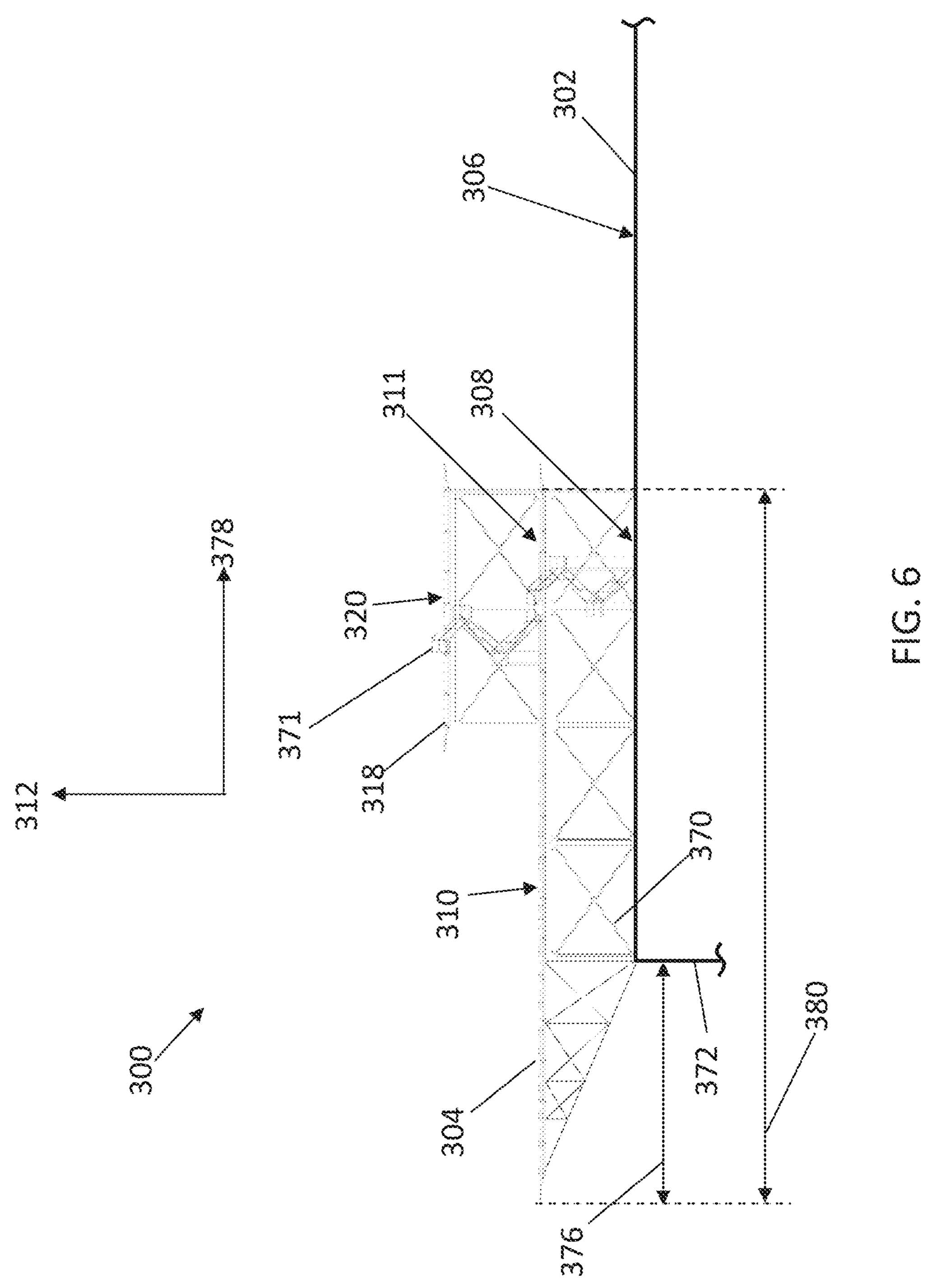
Figure 7:
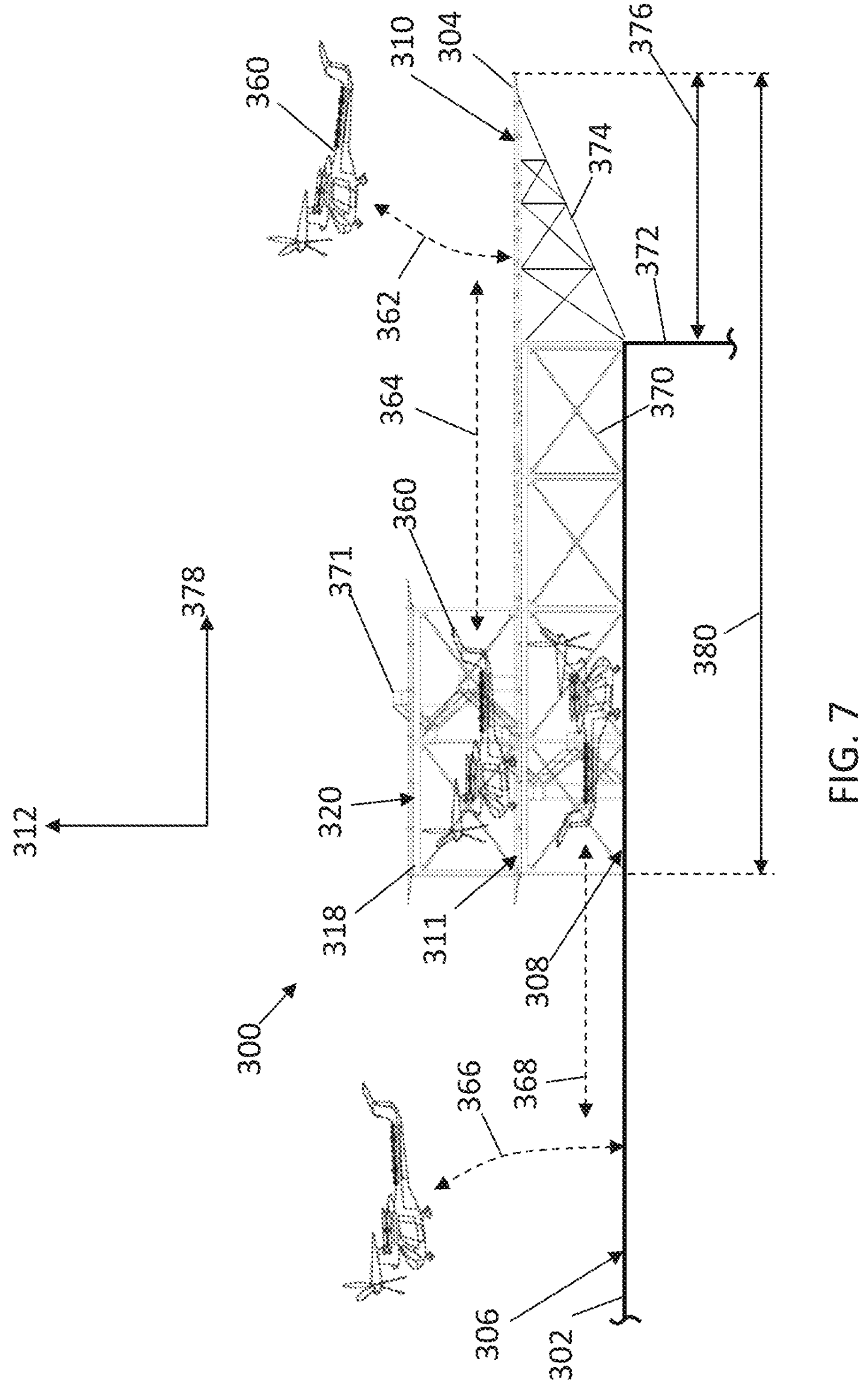
FIG. 7 is a side elevation view of the aircraft landing facility of FIGS. 3 and 4 that schematically illustrates landing and takeoff of VTOL aircraft according to aspects of the present disclosure.

FIGS. 3 and 4 are perspective views of one embodiment of an aircraft landing facility 300 according to aspects of the present disclosure. FIGS. 5 and 6 are a top down view and a side elevation view, respectively, of the aircraft landing facility 300 of FIGS. 3 and 4. FIG. 7 is a side elevation view of the aircraft landing facility 300 of FIGS. 3 and 4 that schematically illustrates VTOL aircraft landing and takeoff.

Referring to FIGS. 3 and 4, the landing facility 300 can include a lower level 302 and an upper level 304. As best seen in FIG. 4, the lower level 302 can include a lower landing area 306 and a lower storage area 308 that is spaced apart from the lower landing area 306. As best seen in FIG. 3, the upper level 304 can include an upper landing area 310 and an upper storage area 311. At least a portion of the upper level 304 can be arranged over the lower storage area 308 with respect to a vertical direction 312.

A computing system can be configured to determine a landing pad location for an approaching VTOL aircraft. For example, the computing system can select a landing pad location from a plurality of predetermined landing pads locations 314 in the lower landing area 306 or from a plurality of predetermined landing pads locations 316 in the upper landing area 310. An additional level 318 may be arranged over the upper storage area 308 of the upper level 302. The additional level 318 may include one or more emergency landing locations 320 in an emergency landing area 300. However, it should be understood that, in some embodiments, the aircraft landing facility 300 may be free of any additional levels above the upper level 304.

The computing system may be configured to dynamically select (e.g., designate) one of the predetermined landing pad locations 314, 316 for an approaching VTOL aircraft based on a variety of factors, including, for example, aircraft data, passenger data, or environment data. The predetermined landing pads locations 314, 316 can be marked by paint, tape, or another permanent or semi-permanent indicator.

In other embodiments, however, the computing system can select one or more of a location or a size of a landing pad that is not pre-defined for an approaching VTOL aircraft. The location and/or size of the landing pad can be selected based on a variety of factors, including, for example, aircraft data, passenger data, environment data, or other factors. As an example, the location and/or size of the landing pad can be determined based, at least in part, on a minimum required distance between the VTOL aircraft and any additional aircraft at the landing facility 300. As noted above, the computing system can wirelessly communicate data describing the landing pad location to the navigation system of the approaching VTOL aircraft. However, in other embodiments, a light array can be disposed on at least one of the lower landing area 306 or the upper landing area 310. The computing system can illuminate or otherwise change an appearance (e.g., brightness, color, etc.). of at least a portion of a border or a center of a landing pad at the landing pad location (as a location marker) using the light array to communicating the landing pad location. For instance, in some embodiments, the light array can include a plurality of lights spaced apart from each in a grid having a plurality of rows and a plurality of columns.

For example, some or all of one or more of the landing areas 306, 310 and/or storage areas 308, 311 may be configured with a tessellation of polygonal-shaped areas configured to dynamically alter emission and/or reflection of light. A variety of suitable polygons may be used for the tessellation (e.g., triangles, rectangles, hexagons, etc.). The tessellation of these surface(s) may allow a large number of lighting patterns to be implemented with a relatively simple construction. For example, lighting configuration may be determined using machine learning methods. The tessellation can provide flexibility in displaying the size and/or location of the landing pad location(s) and/or selected storage areas by lighting different combinations of the polygons to represent the configuration. After a size and location of the landing pad location is determined, a corresponding lighting pattern that approximates the size and location of the landing pad location using a set of polygons may be determined. The identified polygons can be lit up to represent the configuration. In some embodiments, one or more of the polygons may include light emitting devices of different colors, and based on location of the polygon, the color of the polygon may be determined. For example, the storage locations may be represented by a first color (e.g., green) while the landing pad location may be represented by a second color that is different from the first color (e.g., yellow) such that VTOL aircraft vehicles at the landing facility may easily distinguish a landing pad location from and a storage location. The accuracy of the configuration approximation increases when a larger number of polygons are used in the tessellation.

The aircraft landing facility 300 can have a variety of suitable configurations. For example, a plurality of elongated structural members 370 can be configured to support the upper level 304 over the lower level 302. Referring to FIG. 6, the structural members 370 may be or include truss elements. The structural members 370 can be arranged in a variety of configurations, for example, forming square patterns, triangular patterns, or any other suitable pattern providing sufficient structural integrity. The levels 302, 304 can be formed a variety of suitable materials, including, for example, concrete, asphalt, metal, polymeric materials, composite materials, etc. Additionally, the aircraft landing facility 300 can include stairs 371 or other suitable structures (e.g., elevators, escalators, etc.) for allowing passengers to move between levels of the levels 302, 304, 318 of the aircraft landing facility 300.

In some embodiments, the upper level 304 can extend over an edge 372 of the structure (e.g., building, parking garage, etc.) on which the aircraft landing facility 300 is installed/built. This configuration can further minimize the area required to install the aircraft landing facility 300, which may be particularly useful in dense, urban environments. The upper level 304 can be cantilevered over the edge 372 and supported by one or more cantilever support members 374. For example, the upper level 304 can extend beyond the edge 372 of the building by an overhang distance 376 in a horizontal direction 378, which is perpendicular to the vertical direction 312. The upper level 304 can have a length 380 in the horizontal direction 378. In some embodiments, the overhang distance 376 may be greater than about 5% of the length 380 of the upper level 304, in some embodiments greater than about 10%, in some embodiments greater than about 20%, in some embodiments greater than about 30%, in some embodiments greater than about 40%, and in some embodiments greater than about 50%.

Additionally, in some embodiments, the aircraft landing facility 300 can be configured to accommodate a large number of VTOL aircraft relative to the size of a footprint of the aircraft landing facility 300. For example, a total storage area can be defined as a sum each storage area (e.g., the lower storage area 308, upper storage area 311, etc.). A total landing area can be defined as a sum of an area of each landing area (e.g., the lower landing area 306, upper landing area 310, etc.). A total footprint of the aircraft landing facility 300 can be defined as a footprint area of the aircraft landing facility 300 including portions of the aircraft landing facility 300 that extend beyond the edge 372. An effective footprint of the aircraft landing facility 300 can be defined as an occupied area of the surface on which the aircraft landing facility 300 is installed and/or constructed, excluding portions of the aircraft landing facility 300 that extend beyond the edge 372 of the structure.

The effective footprint may range from about 20% to 100% of the total footprint, in some embodiments from about 25% to about 90% in some embodiments from about 30% to about 80%, and in some embodiments from about 35% to about 70%. A ratio of the total landing area to the total storage area can range from about 0.5 to about 2, in some embodiments from about 0.6 to about 1.5, and in some embodiments from about 0.8 to about 1.2. Such ratios may provide a more compact and effective aircraft landing facility. This may be especially useful in densely populated, urban areas.

FIG. 7 schematically illustrates a first VTOL aircraft 360 landing (as represented by dotted arrow 362) on the upper landing area 310 of the upper level 304. The first VTOL aircraft 360 can then be moved from the upper landing area 310 to the upper storage area 311 (as represented by dotted arrow 364). The process can be reversed for the first VTOL aircraft 360 to take off from the upper landing area 310.

Similarly, a second VTOL aircraft 366 can land (as represented by dotted arrow 366) on the lower landing area 306 of the lower level 302. The second VTOL aircraft 366 can then be moved from the lower landing area 306 to the lower storage area 308 (as represented by dotted arrow 368).

In some embodiments, the computing system can be configured to manage multiple VTOL aircraft concurrently, simultaneously, or near simultaneously. For example, the computing system can manage landing and/or takeoff of two VTOL aircraft at the same time (e.g., on the same level or on different levels). As another example, the computing system can determine the landing pad location based on the presence of recently landed VTOL aircraft. The computing system can maintain a minimum safety distance (e.g., 200 feet, etc.) between the VTOL aircraft during takeoff and landing as required by applicable regulations.

Referring to FIG. 5, in one example, the computing system can determine a first landing pad location 380 for a first VTOL aircraft. Landing a second VTOL aircraft on a directly adjacent landing pad location 382 may violate minimum safety distance requirement. Thus, the computing system can select another landing pad location 384 for the second VTOL aircraft that ensures that the VTOL aircraft maintains the required minimum safety distance during landing. The computing system can anticipate and balance demand for particular landing pad locations 314, 316 to improve efficiency (e.g., optimize) the system.

Figure 8:
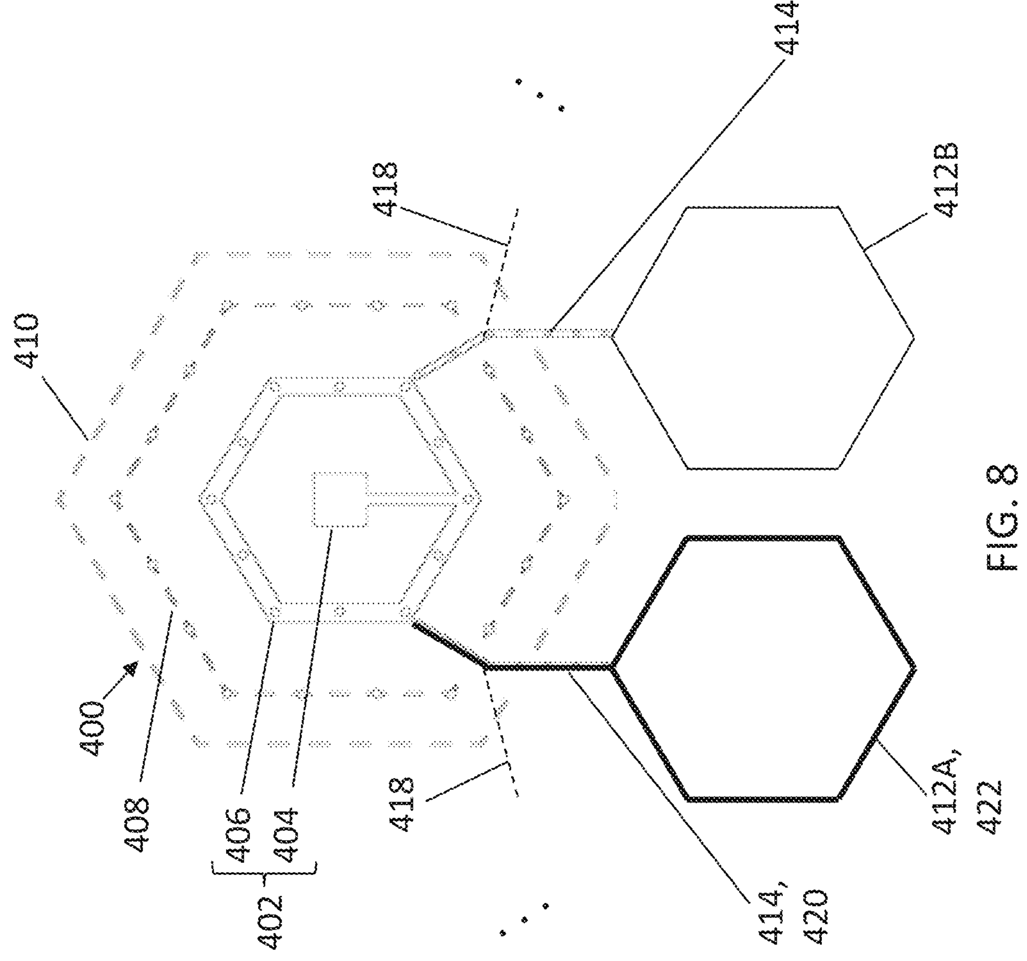
FIG. 8 illustrates examples markings for a landing pad location and one or more storage areas, according to aspects of the present disclosure.

FIG. 8 illustrates examples markings for a landing pad location 400 and one or more storage areas, according to aspects of the present disclosure. The landing pad location 400 may be designated by one or more borders or markers. For example, a Touchdown Lift-Off (TLOF) marker 402 may include a central marker 404 (e.g., a square, triangle, circle, or polygon) surrounded by a boarder 406 (e.g., a polygon, circle). A Final Approach and Take Off (FATO) pad marker 408 may encircle the TLOF marker 402 (e.g., be concentric with the TLOF marker 402). One or more additional boundaries 410 may encircle the TLOF marker 402 and/or be concentric with one or both of the TLOF marker 402 and the FATO pad marker 408. The additional boundaries 410 may designate minimum safety distances for pedestrians or equipment. For example, the FATO marker may have a diameter that is approximately equal to 1.5 times a diameter of the top rotor (if applicable) or a wingspan of the VTOL aircraft (if applicable). The FATO marker (and/or any of the other markers described herein) can be dynamically sized (e.g., using the lighting grid) based on the dimensions of the VTOL aircraft.

For example, the size and location of the landing pad can be selected based on aircraft data, such as the size of the VTOL aircraft (e.g., a wingspan, rotor diameter, etc.), type (e.g., make, model) of the VTOL aircraft, and/or required clearances between the VTOL aircraft and other structures (e.g., parts of the landing facility). As another example, charging stations may be located within the storage areas for various types (e.g., makes, models) of VTOL aircraft. The computing system can select a landing pad location that has access to a portion of the storage area that has a charging station (or fueling station) that is compatible with or best suited for the VTOL aircraft type (e.g., model, charging port type, fuel type etc.). For instance, some storage locations may have charging stations while others have fueling stations. Different storage locations may have different types of charging station and/or fueling stations. As another example, the size and location of the landing pad can be selected based on environmental data such as the location and size of other aircraft present at the landing facility. As a further example, the size and location of the landing pad can be selected based on environmental data that includes weather. For instance, during inclement weather the landing pads/VTOL aircraft can be spaced farther apart or sized larger than during fair weather.

A plurality of storage areas 412A-B may be located near the landing pad location 400. One or more guidance lines 414 may connect the landing pad location 400 with a first storage location 412A and/or a second storage location 412B. In some embodiments, additional storage areas (shown in dotted lines as optional) may also be located near the landing pad location 400. Additional guidance lines 418 may connect the landing pad location 400 with the additional storage locations. The storage locations 412A-B (and/or the additional storage areas) may be located around periphery of the landing pad location 400. For example, the storage locations 412A-B (and/or the additional storage areas) may be spaced apart (e.g., approximately evenly) around a portion of perimeter of the landing pad location 400. One or more guidance lines 414, 418 may connect the landing pad location 400 with the storage locations 412A-B (and/or the additional storage areas).

As indicated above, the computing system can be configured to select one of the plurality of storage locations 412 (and/or the additional storage areas) for storage of the VTOL aircraft based on the at least one of aircraft data, passenger data, or environment data. The computing system can communicate the selected one of the plurality of storage locations 412 (and/or the additional storage areas) to an operator of the VTOL aircraft or a navigation system of the VTOL aircraft.

For example, the computing system can illuminate or otherwise change an appearance (e.g., brightness, color, etc.). of a location marker to communicate a selected storage location 422 for the VTOL aircraft. The computing system can mark a guidance line 420 (illustrated by a heavy weighted line) and/or some or all of a border or marker associated with the selected storage location 422. The navigation system of the VTOL aircraft can follow the marked guidance line 420 to the selected/marked storage area 422 using onboard sensors. Example types of onboard sensors include light, magnetic, radiofrequency sensors, or any other suitable types of sensors. As another example, the operator of the VTOL aircraft can view the marked guidance lines 420 from a cockpit of the VTOL aircraft and guide the VTOL aircraft to the selected/marked storage location 422.

Figure 9:
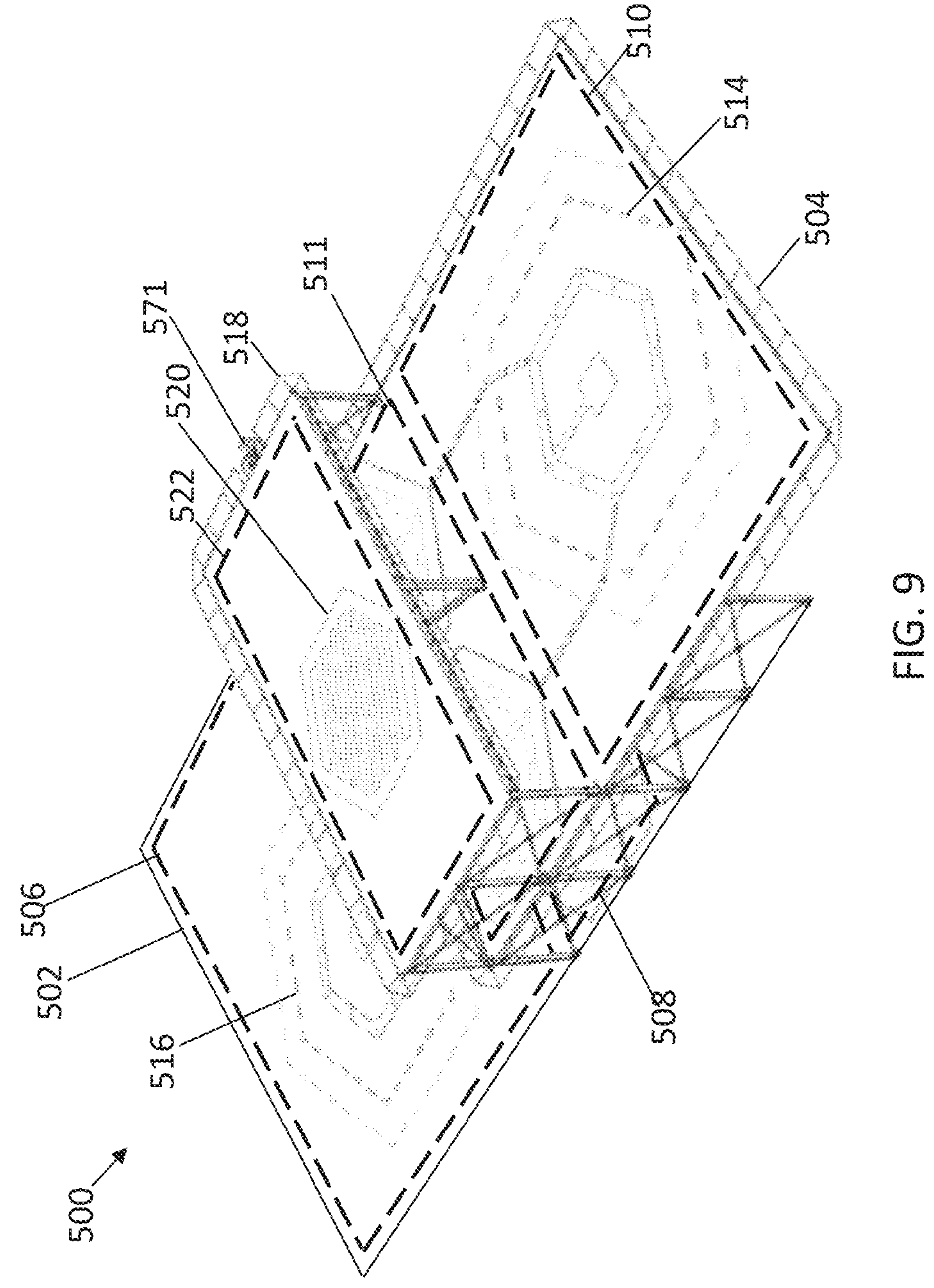
FIG. 9 illustrates a perspective view of another embodiment of an aircraft landing facility including single landing pad on a lower level and a single landing pad on an upper area, according to aspects of the present disclosure.
Figure 10:
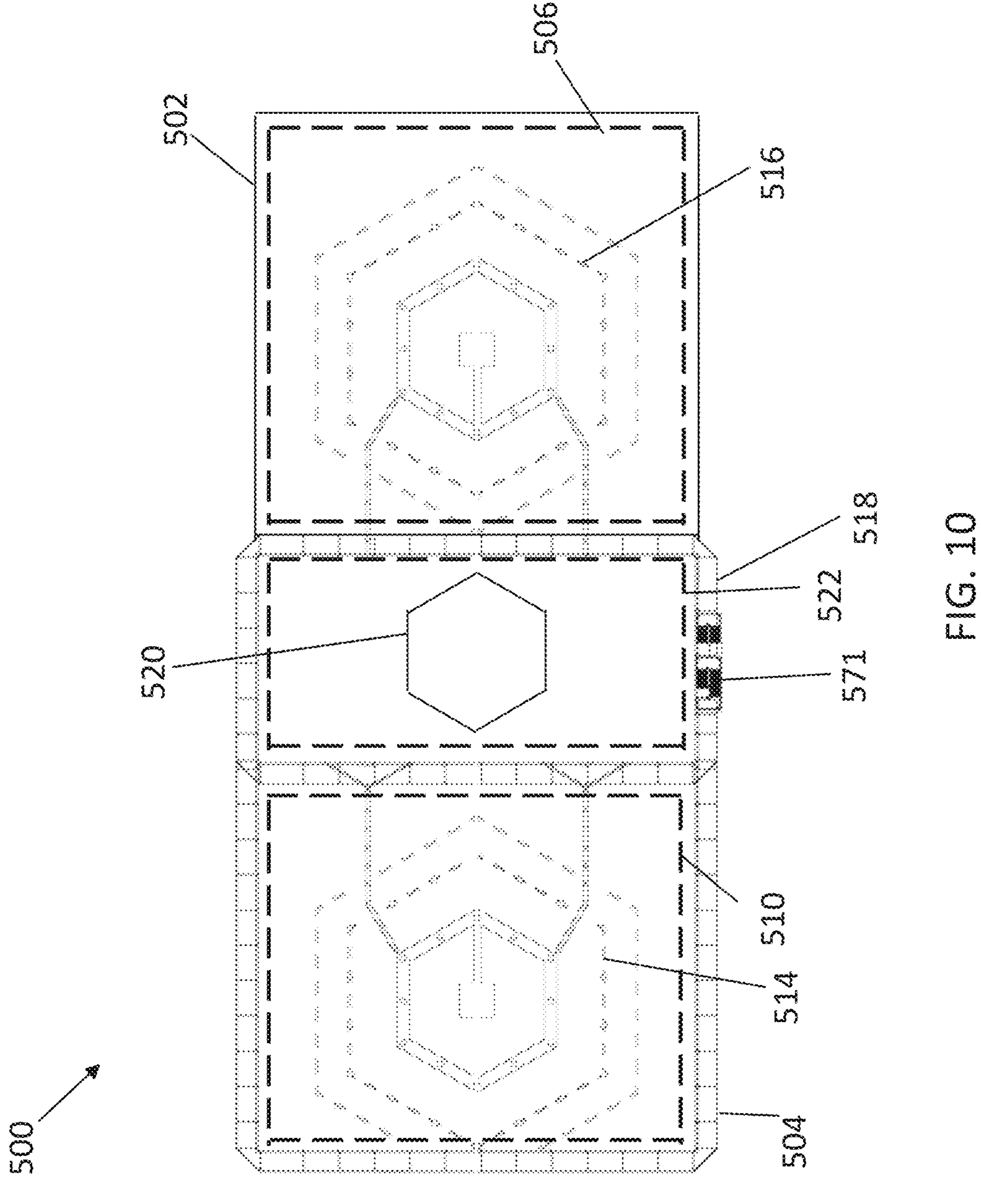
FIG. 10 illustrates a top down view of the aircraft landing facility of FIG. 9.

FIGS. 9 and 10 illustrate a perspective view and a top down view, respectively, of another embodiment of an aircraft landing facility 500. Reference numerals of FIGS. 9 and 10 correspond with those of FIGS. 3 through 7. The aircraft landing facility 500 may include a single landing pad location 514 in the upper landing area 510 and a single landing pad location 516 in the lower landing area 506. An additional level 518 may be supported over the upper storage area 511. The additional level 518 may include an emergency landing location 520 within an emergency landing area 522.

Figure 11:
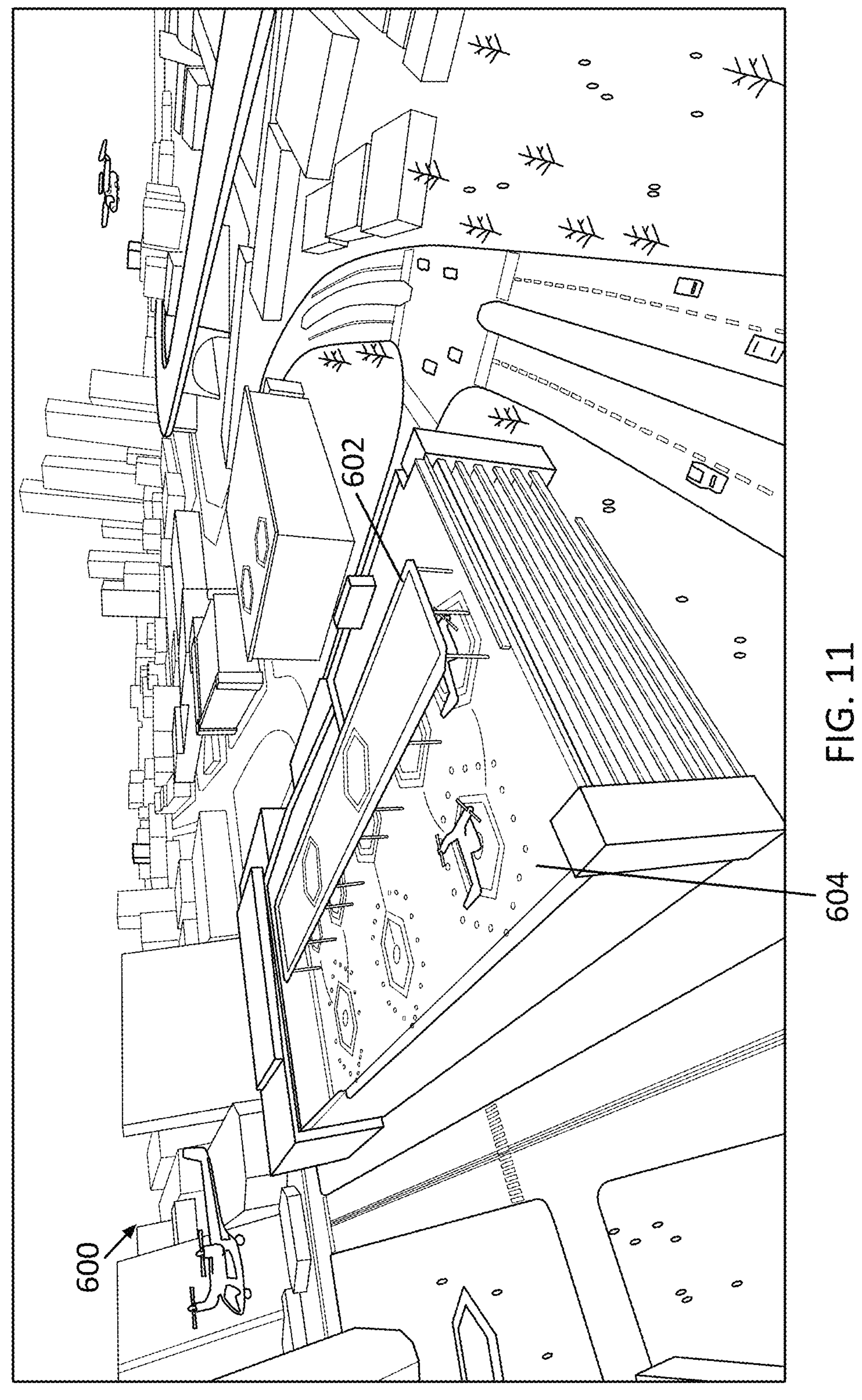
FIG. 11 is a perspective view an alternative embodiment of an aircraft landing facility 600 according to aspects of the present disclosure.

FIG. 11 is a perspective view an alternative embodiment of an aircraft landing facility 600 according to aspects of the present disclosure. The aircraft landing facility 600 can include an upper level 602 that is supported over a lower level 604. As shown, the upper level 602 can include a landing area (e.g., for use in emergencies). However, in other embodiments, the upper level may include an upper landing area for normal use. In other words, in some embodiments, the upper level 602 may be free of storage areas for the VTOL aircraft.

Example Methods

Figure 12:
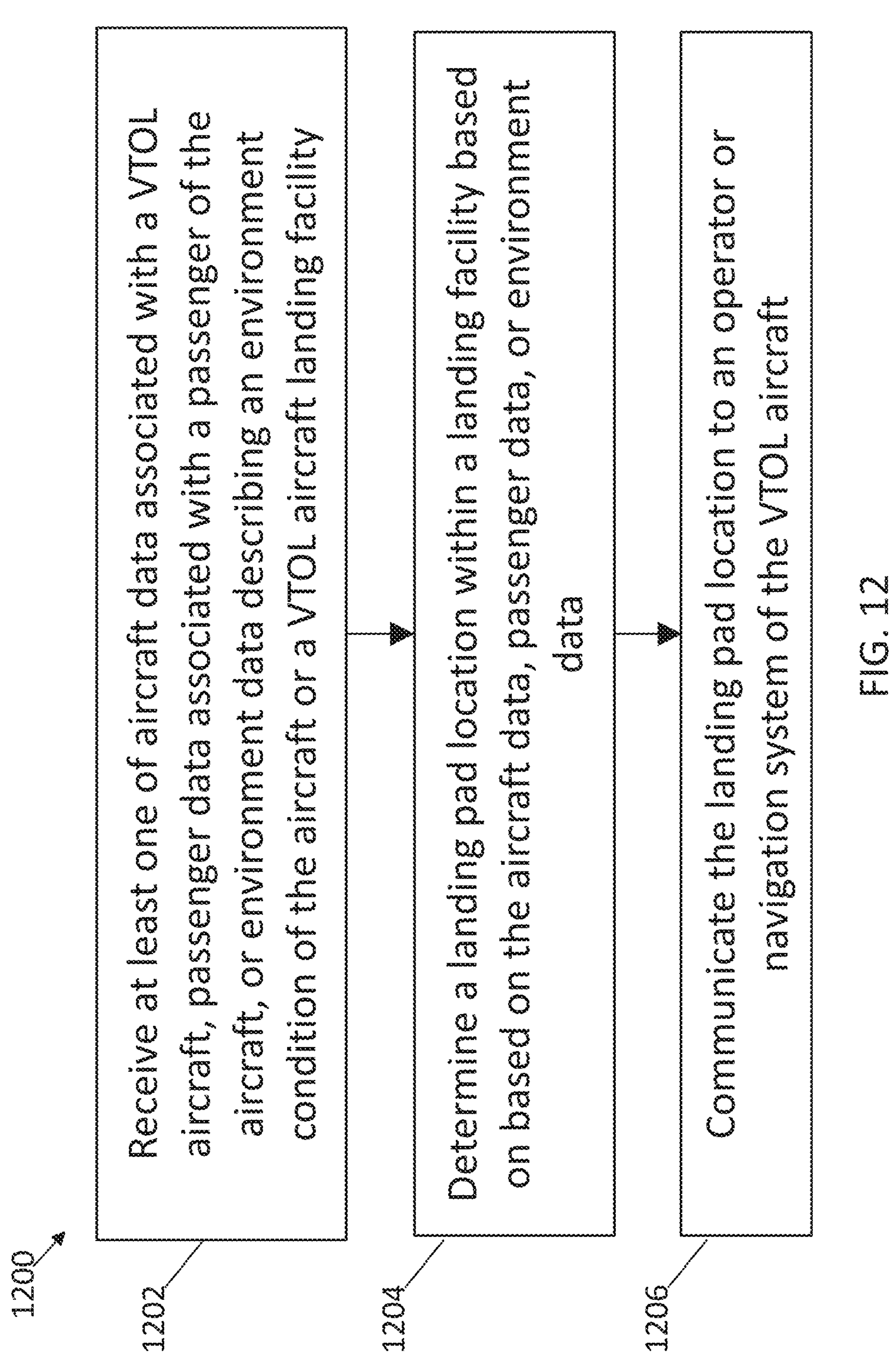
FIG. 12 is a flowchart of a method for landing and storing VTOL aircraft.

FIG. 12 depicts a flow chart diagram of an example method 1200 for landing and storing vertical take-off and landing aircraft. One or more portion(s) of the example method 1200 can be implemented by a computing system that includes one or more computing devices such as, for example, the computing systems described with reference to the other figures (e.g., a cloud services system 102, a landing facility computing system 152, etc.). Each respective portion of the method 1200 can be performed by any (or any combination) of one or more computing devices. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 12 is described with reference to elements/terms described with respect to other systems and figures for example illustrated purposes and is not meant to be limiting. One or more portions of method 1200 can be performed additionally, or alternatively, by other systems.

At 1202, the computing system can receive at least one of aircraft data associated with a VTOL aircraft, passenger data associated with at least one passenger of the aircraft, or environment data describing an environment condition of at least one of the aircraft or a VTOL aircraft landing facility. Example aircraft data may include a size of the VTOL aircraft (e.g., a wingspan, rotor diameter, etc.), weight, a charge state (if applicable), a fuel level (if applicable), a heading of the VTOL aircraft, and/or itinerary information (e.g., a future destination, previous origination) of the VTOL aircraft. The passenger data may include a number of passengers aboard the VTOL aircraft, a disability status of the passenger(s), an age of the passenger(s), a subsequent destination of the passenger(s), and/or an origination location of the passenger(s). Example environment data may include a wind speed, a wind direction, a precipitation condition, a temperature, and/or a presence, size, or location of additional aircraft at the landing facility or approaching the landing facility.

At 1204, the computing system can determine a landing pad location within the landing facility from a plurality of landing pad locations. At least some of the plurality of landing pad locations can be located at different elevations within the landing facility. For example, the landing facility can include a lower level and an upper level. The landing pad location can be selected based on the aircraft data, passenger data, or environment data. This can include determining the elevation of a landing pad location for the VTOL aircraft. For example, the lower level may include a lower landing area and a lower storage area that is spaced apart from the lower landing area. The upper level may include an upper landing area. At least a portion of the upper level can be arranged over the lower storage area with respect to a vertical direction. The landing pad location may include a location within the lower landing area or the upper landing area of the landing facility that is dynamically designated based on the at least one of aircraft data, passenger data, or environment data.

In some embodiments, the computing system can determine the landing pad location based on aircraft data. As one example, the computing system can dynamically designate a landing pad location on the lower level for a VTOL aircraft approaching from the side of the lower level. As another example, the computing system can select a predetermined landing pad location on the upper level for a VTOL aircraft that has a subsequent destination facing the same direction as the upper level. As a further example, the computing system can dynamically determine a size and location of a landing pad location for an approaching VTOL aircraft based on a size (e.g., a wingspan, rotor diameter, etc.) of the VTOL aircraft. As another example, charging stations may be located within the storage areas for various types (e.g., makes, models) of VTOL aircraft. The computing system can select a landing pad location that has access to a portion of the storage area that has a charging station that is compatible with the VTOL aircraft. As an additional example, the computing system can determine an appropriate landing pad size for the approaching aircraft based on an acoustic signature of the approaching VTOL aircraft. For instance, the computing system can detect a property (e.g., rotor configuration, etc.) and/or size (e.g., rotor size, wingspan, etc.) of the approaching VTOL aircraft by analyzing the acoustic signature. The computing system can identify the type (e.g., model, rotor configuration, etc.) of the VTOL aircraft by recognizing the acoustic signature. For instance, the computing system can process the acoustic signature to produce one or more metrics describing the acoustic signature and compare the metrics to a database of metrics associated with acoustic signatures of VTOL aircraft. In some implementations, the computing system can employ a machine-learned recognition/matching model in this capacity. The computing system can then select a landing pad location that is appropriate for the VTOL aircraft based on information determined from the acoustic signature.

In other embodiments, the computing system can determine the landing pad location based on passenger data. As one example, the computing system can designate a landing pad location on the lower level for a VTOL aircraft with elderly people or people with disabilities or health issues aboard. As another example, the computing system can prioritize VTOL aircraft that contain passengers who are rushed based on their itinerary (e.g., have a quick connection with another mode of transportation or have an upcoming appointment) for landing on the lower level. After selecting the lower landing area, the computing system can designate the landing pad location within the selected landing area.

In other embodiments, the computing system can determine the landing pad location based on environment data. As an example, the computing system can select a landing pad location based on presence, location, and/or size of additional VTOL aircraft within the landing areas and/or storage areas and/or required distances between VTOL aircraft during takeoff and/or landing. As a further example, the size and location of the landing pad can be selected based on environmental data that includes weather. For instance, during inclement weather the landing pads/VTOL aircraft can be spaced farther apart or sized larger than during fair weather.

In yet further embodiments, the computing system can determine the landing pad location based on combinations of aircraft data, passenger data, and/or environment data. As one example, the computing system can balance competing factors. For instance, a VTOL aircraft with a passenger having health and/or disability issues can be approaching from the side of the landing facility that the upper landing area faces. The heading or approach direction of the VTOL aircraft (aircraft data) can weigh towards selecting a landing pad location on the upper landing area. The passenger data can weigh for selecting a landing pad location on the lower landing area. The computing system can favor the lower landing area to accommodate the passenger and select a landing pad location on the lower landing area. As a further example, the computing system can determine the landing pad location based on a combination of an acoustic signature of an approaching VTOL aircraft (aircraft data) (e.g., as described above regarding aircraft data) and an ambient environmental noise signature (environment data), for example of additional VTOL aircraft at the landing facility or approaching the landing facility. The computing system can balance competing needs for larger landing pad areas, landing pad areas on the lower level, etc. based on information determined from the acoustic signature of the approaching VTOL aircraft and the ambient environmental noise signature.

At 1206, the computing system can communicate the landing pad location to at least one of an operator of the VTOL aircraft or a navigation system of the VTOL aircraft. In one example, the cloud services system can communicate the landing pad location to the aircraft navigation system via a network. In another example, a landing facility computing system located at the aircraft landing facility can communicate the landing pad location to the aircraft navigation system via the network. In yet further examples, the cloud services system or the landing facility computing system can cause the landing facility to create a visual indication (e.g., illuminate lights) on the lower landing area landing to communicate the landing pad location to the operator or to the navigation system of the VTOL aircraft (e.g., as detected by sensors aboard the VTOL aircraft).

At 1206, the computing system can communicate the landing pad location to at least one of an operator of the VTOL aircraft or a navigation system of the VTOL aircraft. In one example, the cloud services system can communicate the landing pad location to the aircraft navigation system via a network. In another example, a landing facility computing system located at the aircraft landing facility can communicate the landing pad location to the aircraft navigation system via the network. In yet further examples, the cloud services system or the landing facility computing system can cause the landing facility to create a visual indication (e.g., illuminate lights) on the lower landing area landing to communicate the landing pad location to the operator or to the navigation system of the VTOL aircraft (e.g., as detected by sensors aboard the VTOL aircraft).

Additional Disclosure

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 12 depicts steps performed in a particular order for purposes of illustration and discussion, the methods of the present disclosure are not limited to the particularly illustrated order or arrangement. The various steps of the method 1200 can be omitted, rearranged, combined, and/or adapted in various ways without deviating from the scope of the present disclosure.

What is claimed is:

1. A method for landing and charging vertical take-off and landing aircraft, the method comprising:

accessing aircraft data associated with a vertical take-off and landing (VTOL) aircraft, the aircraft data indicating a make and model of the VTOL aircraft and a charging state of the VTOL aircraft;

accessing facility data associated with a VTOL aircraft landing facility, the VTOL aircraft landing facility comprising a plurality of landing pad locations and a plurality of charging stations configured for different charging requirements, wherein a respective charging station is compatible with the make and model of the VTOL aircraft;

computing, based on the aircraft data, a landing pad location from among the plurality of landing pad locations such that the respective charging station that is compatible with the make and model of the VTOL aircraft is accessible to the VTOL aircraft; and transmitting, over a network, the landing pad location to at least one of an operator of the VTOL aircraft or a system of the VTOL aircraft to route the aircraft to the landing pad location.

2. The method of claim 1, wherein computing the landing pad location further comprises computing the landing pad location based on the charging state of the VTOL aircraft.

3. The method of claim 1, wherein the respective charging station comprises a charging port that is compatible with the VTOL aircraft.

4. The method of claim 1, wherein the VTOL aircraft landing facility comprises a storage area, the storage area comprising the respective charging station.

5. The method of claim 4, wherein the storage area is configured based on the dimensions of the make and model of the VTOL aircraft.

6. The method of claim 1, wherein computing the landing pad location further comprises:

computing the landing pad location based on passenger data, the passenger data being indicative of a number of passengers onboard the VTOL aircraft.

7. The method of claim 6, wherein the passenger data is indicative of a subsequent location for at least one passenger of the VTOL aircraft.

8. The method of claim 1, wherein computing the landing pad location further comprises:

computing the landing pad location based on environmental data, the environment data being indicative of one or more conditions of an environment of the VTOL aircraft.

9. The method of claim 8, wherein the one or more conditions comprise at least one of: (i) a wind speed; (ii) a wind direction; (iii) a precipitation condition; (iv) a temperature; (v) an ambient noise signature detected at the VTOL landing facility; (vi) or a presence, size, or location of an additional aircraft at the VTOL landing facility.

10. The method of claim 1, wherein the VTOL aircraft landing facility comprises:

a first level comprising an area that is operable as at least one of: a lower landing area or a lower storage area; and a second level comprising an upper landing area, wherein at least a portion of the upper landing area is arranged as elevated over the area of the first level with respect to a vertical direction, the second level comprising: (i) a Touchdown Lift-Off (TLOF) marker for the VTOL aircraft, (ii) a Final Approach and Take Off (FATO) pad marker for the VTOL aircraft; and (iii) a boundary marker indicative of a safety area, the FATO pad marker encompassing the TLOF marker.

11. A computing system:

one or more processors; and one or more non-transitory computer-readable storage media comprising executable computer program code, the computer program code when executed causing the computing system to perform operations including:

accessing aircraft data associated with a vertical take-off and landing (VTOL) aircraft, the aircraft data indicating a make and model of the VTOL aircraft and a charging state of the VTOL aircraft;

accessing facility data associated with a VTOL aircraft landing facility, the VTOL aircraft landing facility comprising a plurality of landing pad locations and a plurality of charging stations configured for different charging requirements, wherein a respective charging station is compatible with the make and model of the VTOL aircraft;

computing, based on the aircraft data, a landing pad location from among the plurality of landing pad locations such that the respective charging station that is compatible with the make and model of the VTOL aircraft is accessible to the VTOL aircraft; and transmitting, over a network, the landing pad location to at least one of an operator of the VTOL aircraft or a system of the VTOL aircraft to route the aircraft to the landing pad location.

12. The computing system of claim 11, wherein computing the landing pad location further comprises computing the landing pad location based on the charging state of the VTOL aircraft.

13. The computing system of claim 11, wherein the respective charging station comprises a charging port that is compatible with the VTOL aircraft.

14. The computing system of claim 11, wherein the VTOL aircraft landing facility comprises a storage area, the storage area comprising the respective charging station.

15. The computing system of claim 14, wherein the storage area is configured based on the dimensions of the make and model of the VTOL aircraft.

16. The computing system of claim 11, wherein computing the landing pad location further comprises:

computing the landing pad location based on passenger data, the passenger data being indicative of a number of passengers onboard the VTOL aircraft.

17. The computing system of claim 16, wherein the passenger data is indicative of a subsequent location for at least one passenger of the VTOL aircraft.

18. The computing system of claim 11, wherein computing the landing pad location further comprises:

computing the landing pad location based on environmental data, the environment data being indicative of one or more conditions of an environment of the VTOL aircraft.

19. The computing system of claim 18, wherein the one or more conditions comprise at least one of: (i) a wind speed; (ii) a wind direction; (iii) a precipitation condition; (iv) a temperature; (v) an ambient noise signature detected at the VTOL landing facility; (vi) or a presence, size, or location of an additional aircraft at the VTOL landing facility.

20. One or more non-transitory computer-readable storage media comprising executable computer program code, the computer program code when executed causing one or more processors to perform operations comprising:

accessing aircraft data associated with a vertical take-off and landing (VTOL) aircraft, the aircraft data indicating a make and model of the VTOL aircraft and a charging state of the VTOL aircraft;

accessing facility data associated with a VTOL aircraft landing facility, the VTOL aircraft landing facility comprising a plurality of landing pad locations and a plurality of charging stations configured for different charging requirements, wherein a respective charging station is compatible with the make and model of the VTOL aircraft;

computing, based on the aircraft data, a landing pad location from among the plurality of landing pad locations such that the respective charging station that is compatible with the make and model of the VTOL aircraft is accessible to the VTOL aircraft; and transmitting, over a network, the landing pad location to at least one of an operator of the VTOL aircraft or a system of the VTOL aircraft to route the aircraft to the landing pad location.

* * * * *